United States Patent
Faure et al.

(10) Patent No.: US 8,386,518 B2
(45) Date of Patent: Feb. 26, 2013

(54) SERVER FOR MANAGING ANONYMOUS CONFIDENTIAL DATA

(75) Inventors: Frederic Faure, Cassis (FR); Gary Chew, Aix-en-Provence (FR); Lionel Martin, Marseilles (FR)

(73) Assignee: Gemalto SA, Meudon (FR)

( * ) Notice: Subject to any disclaimer, the term of this patent is extended or adjusted under 35 U.S.C. 154(b) by 299 days.

(21) Appl. No.: 12/309,192

(22) PCT Filed: Jul. 9, 2007

(86) PCT No.: PCT/EP2007/056998
§ 371 (c)(1),
(2), (4) Date: Jan. 9, 2009

(87) PCT Pub. No.: WO2008/006811
PCT Pub. Date: Jan. 17, 2008

(65) Prior Publication Data
US 2009/0319488 A1 Dec. 24, 2009

(30) Foreign Application Priority Data
Jul. 10, 2006 (FR) ...................................... 06 52896

(51) Int. Cl.
*G06F 17/30* (2006.01)
(52) U.S. Cl. ....................................................... 707/781
(58) Field of Classification Search .................. 707/687, 707/781, 999.009, 999.101
See application file for complete search history.

(56) References Cited

U.S. PATENT DOCUMENTS

| | | | |
|---|---|---|---|
| 6,553,351 B1 * | 4/2003 | De Jong et al. | 705/69 |
| 7,188,086 B2 * | 3/2007 | Shinzaki et al. | 705/51 |
| 7,593,548 B2 * | 9/2009 | Dharmarajan et al. | 382/103 |
| 2002/0184530 A1 * | 12/2002 | Spector | 713/201 |
| 2003/0079136 A1 * | 4/2003 | Ericta et al. | 713/185 |
| 2004/0139025 A1 | 7/2004 | Coleman | |
| 2005/0044059 A1 | 2/2005 | Samar | |
| 2006/0031213 A1 | 2/2006 | Wilson et al. | |

OTHER PUBLICATIONS

Arthur Fuller, "Intelligent Database Design Using Hash Keys", Feb. 17, 2006, pp. 1-3.
International search Report (PCT/ISA/210), Oct. 22, 2007.

* cited by examiner

*Primary Examiner* — Amresh Singh
(74) *Attorney, Agent, or Firm* — Buchanan Ingersoll & Rooney PC (57) ABSTRACT

When a user records confidential data in a communicating object, the user inputs the confidential data which are encoded and transmitted, with a reference of the user, towards a server in order to record the encoded confidential data in association with the reference. When a user searches for a reference of another user of a communicating object in the communicating object, the user inputs a search datum which is encoded and transmitted to the server for comparing therein the encoded search datum transmitted to all of the encoded confidential data recorded in the server. The server transmits a reference associated with an encoded confidential datum corresponding to the encoded search data to the communicating object. In this way, the user of the communicating object is put into contact with the other user without knowing the data of the other user.

11 Claims, 4 Drawing Sheets

SERVER FOR MANAGING ANONYMOUS CONFIDENTIAL DATA

The present invention relates to a server managing anonymous confidential data.

In servers managing personal data directory implemented in networks having an infrastructure of the Internet type, such as an electronic mail server in which mail addresses are stored, users must supply the server with information characterizing them. Such a managing server may be attacked by a evilly disposed entity which accesses, in the server database, all the personal information of the users in order to use them fraudulently.

In the case of decentralized networks of the ad-hoc type, the user's terminals locally keep in the memories thereof their personal data and exchange them directly with other terminals during a point to point communication. A first terminal wishing to communicate with a second terminal in the network must first make a search relative to information characterizing the second terminal, in order to obtain a contact identifier of the second terminal such as the phone number or an Internet address. During this search, the first terminal must get in contact with many terminals in the network in order to obtain a first contact with the second terminal, which entails a long searching time and keeps the network busy for a very long time.

One solution to the drawbacks mentioned above is recommended in the application for the American patent US 2004/0139025 filed on Nov. 10, 2003 relating to a method for protecting personal information. This method provides the control and confidentiality of individuals' personal information, forbids a non authorized utilization thereof, and allows a utilization thereof limited by rights of access. The data relating to individuals are collected and maintained in a protected base of confidential data. The rights of access to the confidential data of an individual are included in notifications transmitted from the entity managing the database to other parties implied in transactions of the individual's confidential data. Thus, each party implied in the transaction knows the individual's identity and may then communicate directly with him or her.

The aim of the invention is the search for a contact of a user based on his or her private personal information without disclosing it. Thus, an entity having carried out such a search is put in contact with the user without knowing the user's personal data.

To reach this goal, a method for managing confidential data of users of communicating objects recorded in server means, the communicating objects and the server means communicating through a telecommunication network, is characterised in that it includes the following steps:

recording encoded confidential data and a reference of a user transmitted from a first communicating object in the server means, and searching for a reference of a user among recorded encoded confidential data associated with other references of users in the server means as a function of at least one encoded search datum transmitted from a second communicating object, and transmitting at least one reference of a user associated with one encoded confidential datum corresponding to the encoded search datum by the server means to the second communicating object.

More particularly, the recording of encoded confidential data may include the inputting of confidential data of the user from the first communicating object, the encoding of said confidential data and the transmission of the encoded confidential data and the reference of the user to the server means in order to record the confidential data encoded in association with the reference of the user in the server means among the encoded confidential data associated to references of other users. The search for the reference may include the inputting of at least one search datum from the second communicating object, the encoding of the search datum into the encoded search datum, the transmission of the encoded search datum to the server means, so that the latter compares the transmitted encoded search datum to all the encoded confidential data recorded in the server means and transmits to the second communicating object at least the reference associated with the encoded confidential datum corresponding to the encoded search data.

According to the invention, the server means includes no user's personal data but encoded confidential data which cannot be read by a malevolent entity trying to have access to the data in the server means. Then the method according to the invention offers the advantage of obtaining the reference of a user of the network from search data characterizing the user in order, for example, to get in touch with him or her without the latter disclosing his or her personal confidential data.

According to one characteristic, the method includes the updating of at least a first confidential datum of the user into a confidential datum modified from the first communicating object, the encoding of said modified confidential datum and the transmission of the first encoded confidential datum, of the encoded modified confidential datum and of the reference of the user to the server means, the deletion of one encoded confidential datum associated to the reference of the user in the server means and identical to the first transmitted encoded confidential datum and the recording of the encoded modified confidential datum in association with the reference of the user into the server means.

According to another characteristic of the invention, during the recording, each confidential datum is associated with a category which characterises it and is recorded encoded in the server means in association with said category and said reference and during the search, the reference and the category associated, in the server means, with an encoded confidential datum corresponding to the encoded first datum are transmitted to the second communicating object.

According to yet another characteristic of the invention, during the recording, the confidential datum input by the user into the first communicating object is derived in at least one confidential derivation which is also encoded, transmitted to the server and recorded in the server means in association with the reference of the user of the first communicating objet; and during the search, the search datum in the second communicating object is derived into at least one search derivation which is encoded, transmitted to the server means and compared to the encoded confidential data and to the associated encoding confidential derivations recorded in the server means.

Another object of the invention is also a server means for managing confidential data of users of communicating objects through a telecommunication network. The server means is characterised in that it includes:

means for recording encoded confidential data and a reference of the user transmitted from a first communicating object, means for searching a reference of a user among recorded encoded confidential data associated to other references of users as a function of at least one encoded search datum transmitted from a second communicating object, and means for transmitting at least a user's reference associated to an encoded confidential datum corresponding to the encoded search datum to the second communicating object.

The invention also relates to a communicating object communicating through a telecommunication network with a server means for managing users' confidential data. The communicating object is characterised in that it includes, during the recording of confidential data of the user of the communicating object:

means for inputting said confidential data;
means for encoding said confidential data; and
means for transmitting the encoded confidential data and a reference of the user to the server means in order to record the encoded confidential data in association with the reference of the user in the server means among encoded confidential data associated to other users' unique references.

The invention also relates to a communicating object, communicating through a telecommunication network with a server means for managing users' confidential data. The communicating object is characterised in that it includes, during the search for a reference of the user of another communicating object:

means for inputting at least one search datum;
means for encoding the search datum into an encoded search datum; and
means for transmitting the encoded search datum to the server means so that the latter compares the transmitted encoded search datum to all the encoded confidential data recorded in the server means and transmits to the communicating object at least one user's reference associated with an encoded confidential datum corresponding to the encoded search datum.

More generally a communicating object according to the invention may include both means mentioned in the two previous paragraphs.

Finally, the invention relates to a computed program able to be implemented in server means communicating with communicating objects through a telecommunication network for managing confidential data of users of communicating objects. The program includes instruction which, when the program is run in said server means, carry out the steps according to the method of the invention.

Figure 1:
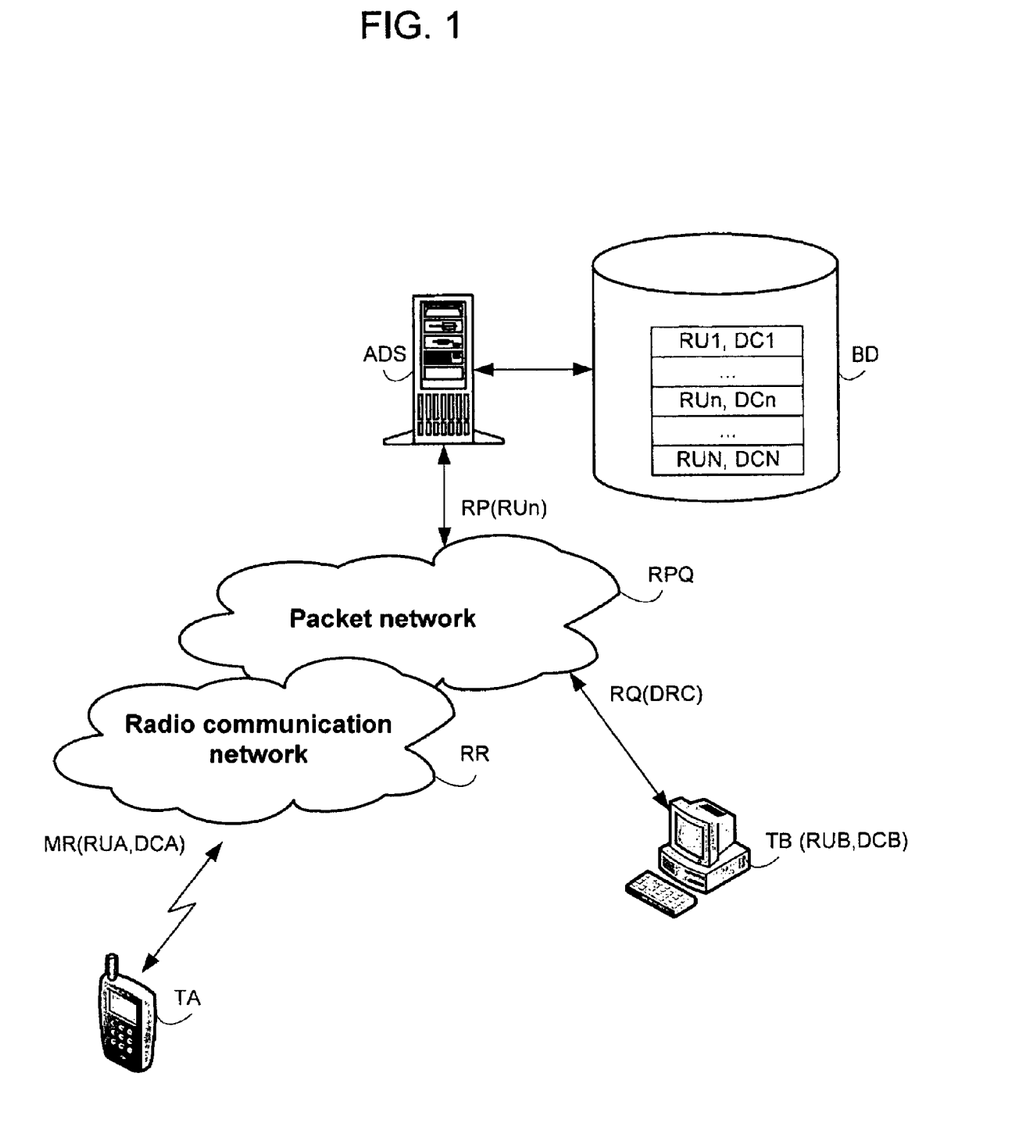
FIG. 1 is a schematic block diagram of a system for managing anonymous confidential data implementing a method for managing anonymous confidential data according to the invention.

Other characteristics and advantages of the present invention will become evident upon reading the following description of several embodiments of the invention given as non limitative examples and referring to the appended corresponding drawings wherein:

FIG. 1 represents a system for managing anonymous confidential data comprising a server for managing anonymous confidential data ADS and communicating objects such as a mobile radio terminal TA, a personal computer TB or any other personal communication device through a telecommunication network RR-RPQ.

The telecommunication network includes a cellular radio communication network RR of the GSM type with the management of mobility and access through a GPRS radio channel or of the CDMA (Coded Division Multiple Access) type, of the third generation (3GPP) of the UMTS (Universal Mobile Telecommunications System) or UTRAN (UMTS Terrestrial Radio Access Network) types or of the third generation (3GPP2) of the CDMA 2000 type backed by a switching data network RPQ of the internet type. The network RT can also be a local network of the WiFi (Wireless Fidelity), WiMax (Worldwide Interoperability for Microwave Access) or Wibro (Wireless Broadband) types or still a wireless network of the infrared, Bluetooth or NFC (Near Field Communication) types.

The server for managing anonymous confidential data ADS is connected to or includes a data base BD which contains encoded confidential data DC1 to DCN, respectively associated with unique references RU1 to RUN. Confidential data DCA, DCB with $1 \leq A \leq N$, $1 \leq B \leq N$, are for example personal data of a user of a communicating object TA, TB and for example correspond to the user's name, first name, birth date, personal address, telephone number or numbers, function, professional address. The unique reference RUA, RUB of the user may be his or her phone number. However it is preferred that this unique reference remains anonymous and characterises the user and/or his or her terminal without making it possible to directly identify the user and allow a direct communication with him or her.

The user wishing to communicate with another user without necessarily disclosing his or her personal data uses the managing server of the invention.

Figure 3:
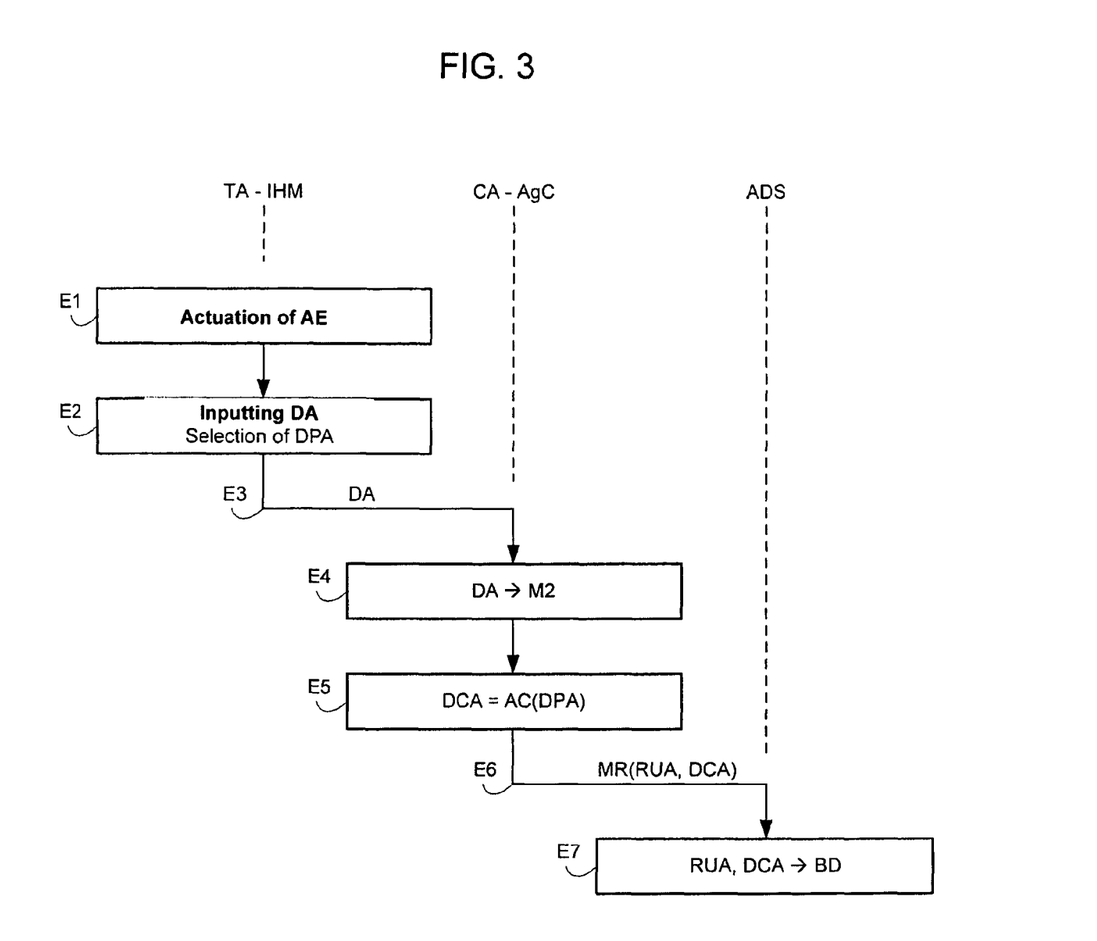
FIG. 3 is an algorithm representing a first main step of the method for recording users' confidential data according to the invention.
Figure 4:
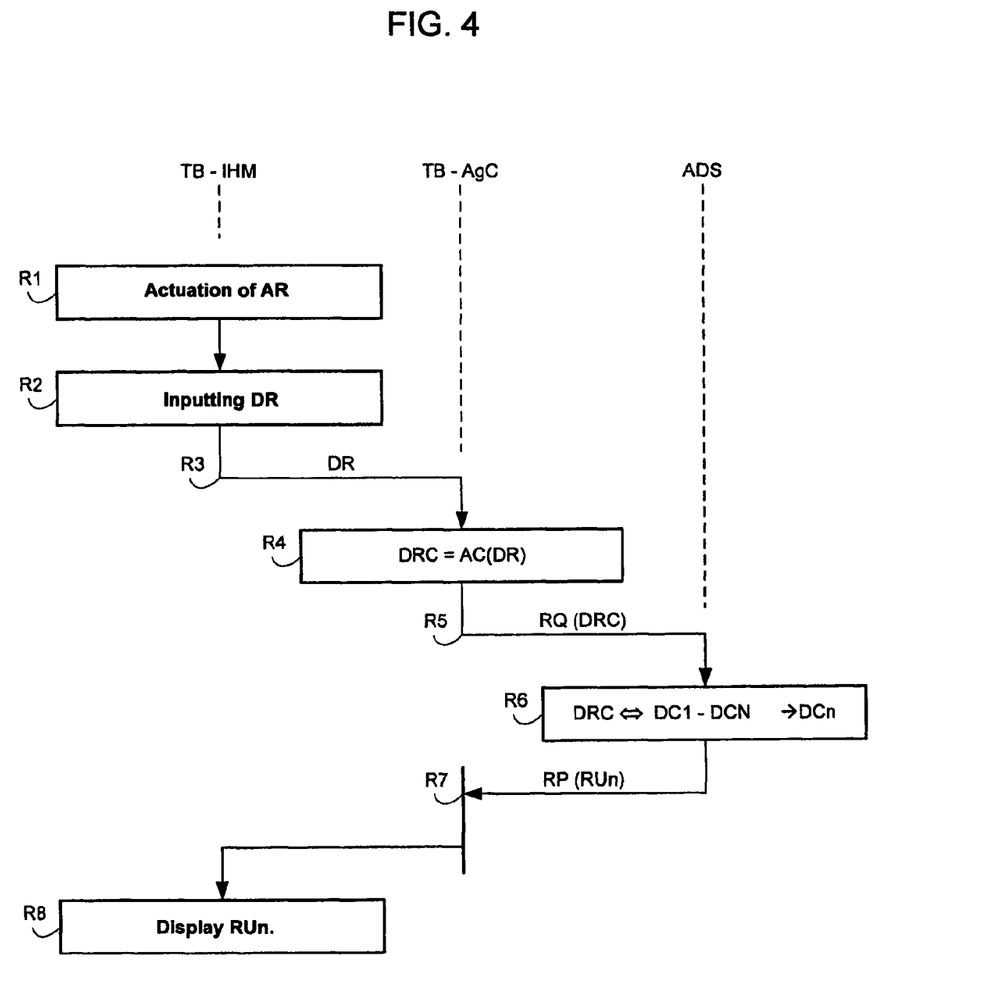
FIG. 4 is an algorithm representing a second main step of a method according to the invention to search for a reference relating to a user's anonymous confidential data.

The managing server implements a method for managing anonymous confidential data including two main steps respectively represented in FIGS. 3 and 4. Such main steps are the recording of a user's encoded anonymous confidential data associated with the unique reference of the user in the database BD and a search for the unique reference of a user as a function of an encoded search datum among users' encoded anonymous confidential data recorded in the database BD.

During the recording of confidential data of the user of a first communicating object, for example the mobile radio terminal TA, the terminal TA transmits the confidential data in an encoded form DCA and a unique reference RUA characterizing the user of the terminal to the server ADS via the radio communications network RR and packet networks RPQ. The server ADS records the data DCA in association with the reference RUA in the database BD.

During the search for confidential data by the user of a second communicating object for example a personal computer TB, the computer TB transmits a request RQ containing encoded search data DRC to the server ADS via the packet RPQ. In answer, the server transmits back the reference or references of the user RUn relating to confidential data DCn recorded in the database BD and corresponding to the search data DRC, with $1 \leq n \leq N$.

When the communicating object is a mobile terminal TA, the exchange of data between the terminal TA and the server ADS is carried out between the radio communications network RR and the packet network RPQ through for example a communication gateway which is not shown in FIG. 1. The communication gateway may include an access gateway for communicating with the server ADS through the high speed packet network RPQ. Another access gateway of the communication gateway communicates with at least one switch of the radio communications network RR through an access network such as a packet network of the X.25 type or an RNIS (Réseau Numérique à Intégration de Service or Integrated Services Digital Network) or an ATM (Asynchronous Transfer Mode) network.

The communication gateway exchanges with the mobile radio terminal TA through the network RR messages encapsulating IP (Internet Protocol) packets transmitted to and by a server ADS through the network RPQ.

Figure 2:
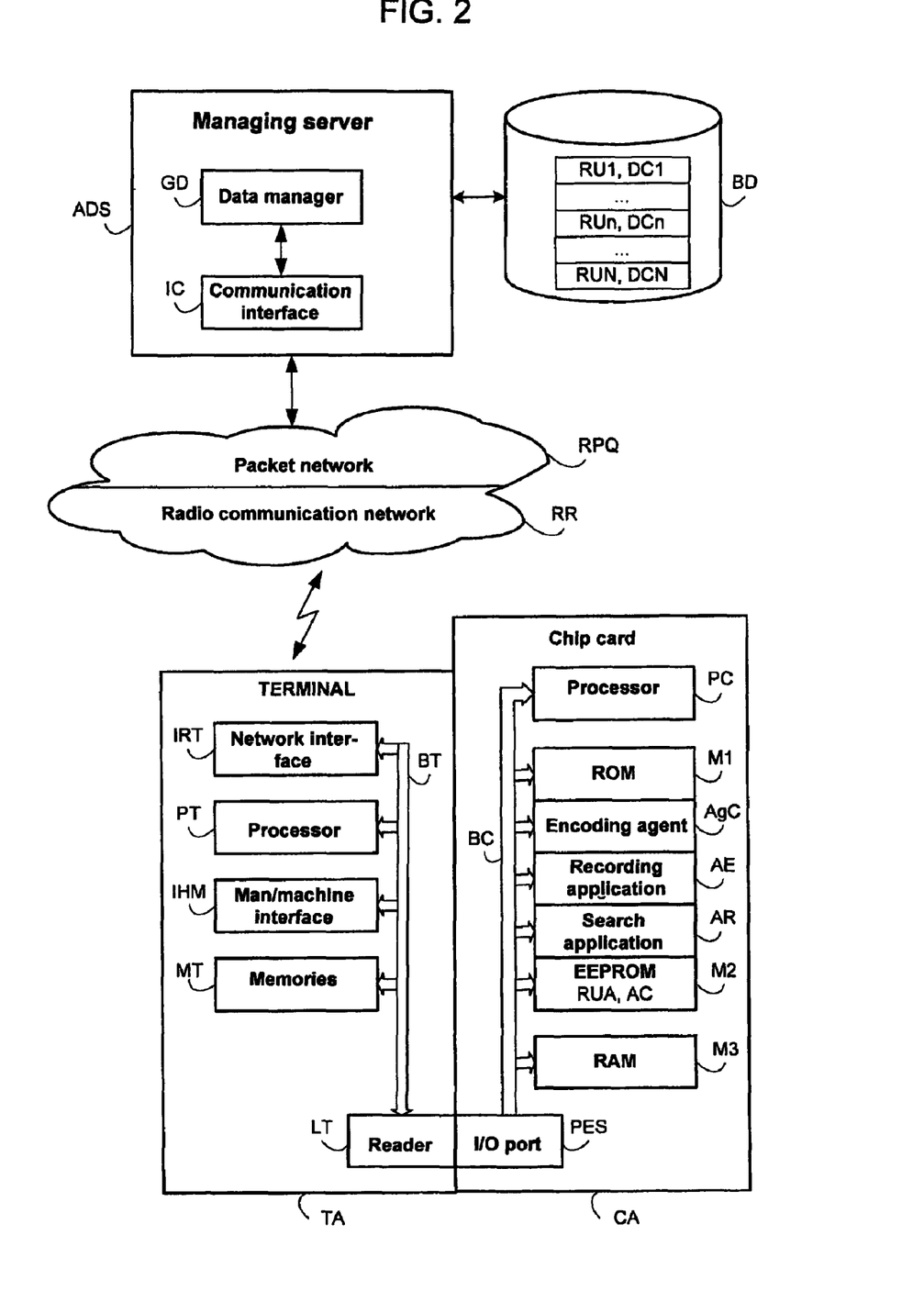
FIG. 2 is a more detailed block diagram of the system of FIG. 1.

In FIG. 2 is shown the server managing anonymous confidential data ADS and the communicating object TA in the form of function blocks, most of which provide functions having a connection with the invention and may correspond to software and/or hardware modules.

Not to make FIG. 2 too complex the communicating object TB is not shown.

The server managing anonymous confidential data ADS includes a data manager GD managing various operations in the database BD and a communication interface IC for transmitting and receiving packets IP through the packet networks RPQ.

The operations managed by the manager GD are more particularly the recording of encoded confidential data of a user transmitted by the user's communicating object in association with the user's unique reference, the search for encoded confidential data in the base BD by comparison with such data transmitted by another communicating object and the writing of an answer RP containing one or several references relating to the encoded confidential data in the database corresponding to the search data.

The communicating object TA illustrated in FIG. 2 is a mobile radio terminal associated, with or without a contact, with a chip card CA.

The mobile radio terminal TA includes a radio interface IRT, a processor PT, a man/machine interface IHM, memories MT and a card reader LT. The various elements of the terminal are interconnected by a bidirectional bus BT.

The interface IHM controls the interaction between the terminal TA and the user of the terminal and includes a keyboard associated with a display and/or touch screen and if need be a voice recognition device.

The chip card CA is an MMC (Multi-Media Card) or an SD (Secure Digital) or a USB (Universal Serial Bus) or a UICC (Universal Integrated Circuit Card) chip card. The UICC chip card is for example a card provided with a SIM (Subscriber Identity Module) application when the terminal hosting the card is a mobile connected to a network of the GMS/GPRS (Global System for Mobile communications/General packet Radio Service) or a USIM (Universal Subscriber Identity Module), RUIM (Removable User Identity Module), ISIM (IP Subscriber Identity Module) or EAP-SIM (Extensible Authentication Protocol) types, when the terminal hosting the card is a mobile operated with a CDMA (Coded Division Multiple Access) of the third generation (3GPP) of the UMTS or UTRAN types or of the third generation (3GPP2) of the CDMA 2000 type.

The chip card CA mainly includes a processor PC or several processors and three memory blocks M1 to M3. The card exchanges commands or requests and answers with terminal TA through an inlet/outlet port PES and the reader LT with or without contact. The various elements of the card are interconnected by a bidirectional bus BC.

The memory M1 is of the ROM or Flash type and includes the system operating the card.

The memory M2 is a non volatile memory for example an EEPROM or Flash memory, more particularly for storing keys, identity numbers and other parameters of the profile of the user owning the card like personal data, a PIN code and other protection data. The memory M2 also includes the unique reference of the user RUA and an encoding algorithm AC. The encoding algorithm AC has a special feature in that it makes a unidirectional encoding on a data which makes it subsequently impossible to find the datum by applying a reverse algorithm. The encoding algorithm is for example an asymmetric enciphering algorithm or a generator of a graphic representation showing the datum once encoded.

The memory M3 is a RAM or SRAM memory more particularly used for processing data.

The chip card CA further includes with respect to the invention a recording application AE, a search application AR and a software module called encoding agent (applet) AgC distributed in memories M1 and M2.

The applications AE and AR relate to the two separate main steps of the method of the invention and are operated from the man/machine interface IHM under the control of the user of the terminal.

The recording application AE displays on the interface IHM fields for the user of the terminal to input and validate personal data when the latter wishes to record it into the server ADS.

The search application AR displays on the interface IHM fields for the user to input and validate search data when the latter wishes to obtain a unique reference of another user of a terminal of the telecommunication network who already recorded his or her personal data into the server ADS. The search application also displays the unique reference or references obtained from the server ADS or a result deduced from such references.

According to an alternative solution, both application AE and AR are the same application.

The encoding agent AgC has the main function of recording into the memory M2 and encoding the data input and validated on the man/machine interface IHM in order to transmit it in an encoded form to the server ADS.

The role of the encoding agent AgC and of both applications is described in greater details while referring to FIGS. 3 and 4.

According to an alternative solution, the memories MT of the terminal TA include both applications AE and AR and optionally the encoding agent AgC.

According to another alternative solution, the communicating object of the user such as the terminal TA associated to the chip card CA only includes one of the two applications AE and AR either for recording personal data or for carrying out a search in order to obtain the reference or references of other users.

The invention is not limited to a mobile radio terminal associated with a chip card. The chip card may also be a card included in a portable computer, for example, connected to a mobile terminal or directly connected to an internet network, a payment card, an electronic purse card, a health card, an electronic passport or any other additional card connected to a mobile terminal.

According to other alternative solutions, the invention applies to other portable communicating electronic objects such as personal computers or communicating personal digital assistants PDA.

While referring to FIG. 3 and as regards the communicating objects TA and TB in FIGS. 1 and 2, the main step of recording confidential data of the method for managing anonymous confidential data includes steps E1 to E7.

During step E1, the user of the mobile radio terminal TA actuates the recording application AE using the interface IHM. The latter displays fields for inputting personal data such as a name field, a first name field, a date field, an address field, a phone number field and a function field.

The user inputs personal data DA during step E2. Optionally, the user selects among the input personal data those DPA he or she wishes to record in an anonymous and confidential way into the server ADS in order to allow a subsequent search for his or her reference by another user.

When the recording is validated after the selection of a validation icon for example on the interface IHM, at step E3, the recording application AE transfers the data input to the encoding agent AgC. The latter records all the personal data DA transferred into the memory M2 of the card during step E4. Then, during step E5 the agent AgC applies the unidirectional encoding algorithm AC to the selected data DPA in order to encode them into encoded personal data DCA.

During step E6, the agent AgC draws up a recording message MR including the encoded personal data DCA and the reference RUA of the user as read in the memory M2. The message MR is transmitted by the radio interface IRT of the terminal TA to the server ADS.

Upon reception of the message MR by the communication interface IC in the server ADS during step E7, the data manager GD of the server ADS records the encoded confidential data DCA in association with reference RUA in the database BD.

According to an alternative solution, the message MR also includes for each transmitted encoded personal data the category or an identifier of the category of the associated input field transmitted not encoded such as the "name", "first name", "date", "address", "phone number" or "function". Then in the database, each encoded personal data is recorded in association with the category thereof or with the identifier of the category and the set of data DCA and their categories is recorded in association with the unique reference of the user RUA.

When the recording of the encoded confidential data of the user into the server ADS is completed, the user may modify some of such confidential data and thus update the data in the server means.

For updating the confidential data of the user, the recording application AE optionally displays all the confidential data stored in the memory M2 using the interface IHM of the terminal. The user modifies one confidential datum or several confidential data, some of which have been previously selected or are newly selected by the user to be recorded in an anonymous way into the database BD of the server ADS. Upon the validation of the updating, after selecting a validation icon for example on the interface IHM, the application AE transfers the modified data to the encoded agent. The latter updates it in the memory M2 by overwriting the corresponding initial data and encodes the selected modified data. Then the encoding agent transmits a message containing the encoded modified confidential data, the encoded initial confidential data and the reference of the user to the server ADS.

Upon reception of the message, the data manager GD of the server ADS deletes in the database BD the encoded confidential data which are associated with the reference of the user retrieved from the message and which are identical to the encoded initial confidential data also retrieved from the message. The manager GD records in the database BD the encoded modified confidential data retrieved from the transmitted message, in association with the reference of the user.

Now referring to FIG. 4 and as regards the communicating objects TA and TB in FIGS. 1 and 2, the main step of search for confidential data of the method managing anonymous confidential data includes steps R1 to R8.

During step R1, the user of the personal computer TB wishing to obtain the reference RUA of the user of the terminal TA actuates a search application AR using the interface IHM. The latter displays fields for searching confidential data such as a name field, a first name field, a date field, an address field, a phone number field and a function field.

During step R2, the user of the computer TB types in the search field or fields at least one search datum DR or often search data DR characterizing the user of the terminal TA which the user of the computer TB wishes to be put in contact with, for example.

When a search is validated after the selection of a validation icon for example on the interface IHM, during step R3, the search application AR transfers the input search datum or search data DR to the encoding agent AgC of the computer TB. During step R4, the agent applies the unidirectional encoding algorithm AC, identical to the one used by the encoding agent of the terminal TA, to the search datum DR in order to encode it into an encoded search data DRC. The data DR is thus encoded in a way similar to the personal data recorded in an encoded form into the database BD.

During step R5, the agent AgC of the computer TB draws up a request RQ including the encoded search data DRC. The request RQ is transmitted to the server ADS by a communication interface of the computer TB to the server ADS.

Upon reception of the request RQ by the communicating interface IC in the server ADS, during step R6, the data manager GD of the server ADS compares the encoded confidential data DCn associated with each reference Run to the transmitted encoded search data DRC retrieved from the request RQ. If one datum or several confidential data are identical to one encoded search datum or several encoded search data DRC respectively then the references associated with the encoded confidential data is copied into an answer RP drawn upon the manager GD.

The manager GD carries out the same operation for each reference recorded in the database BD, the encoded search data DRC retrieved from the request RQ being possibly identical to some encoded confidential data associated with two or more different references RU1 to RUN.

As soon as all the confidential data associated with all the references in the database are compared, the answer RP including one or several references RUn associated to confidential data identical to encoded search data DRC is transmitted to the computer TB.

During step R7, the answer RP is processed by the encoded agent AgC of the computer TB which commands the search application AR to display the transmitted references RUn using the man/machine interface IHM, during step R8.

As an alternative solution, the request RQ also includes, for each transmitted encoded search datum, the category or an identifier of the category, of the associated search field transmitted encoded such as "name", "first name", "date", "address", "phone number" or "function". Thus the data manager GD of the server ADS compares the encoded confidential data DCn associated with each reference RUn and the categories associated with such data respectively with the encoded search data DRC and with the transmitted associated categories retrieved from the request RQ. This makes it possible to draw up an answer containing the references corresponding to the encoded confidential data which are identical to the encoded search data and the associated categories which are identical to the categories associated to said encoded search data.

According to a second alternative solution, the data manager GD includes in the answer RP one or several reference(s) RUn in association with encoded search data identical to the encoded confidential data associated with said references in the database BD. Upon reception of the answer RP in the computer TB, the search application AR of the computer TB displays, using the man/machine interface IHM, the transmitted references RUn together with the corresponding search data input by the user during step R1 and relating to the encoded search data retrieved from the answer RP.

According to a third alternative solution, for each encoded confidential datum corresponding to an encoded search datum, the category associated with the confidential datum is included in the answer RP in association with the reference relating to said confidential datum. The answer RP thus includes one or several references associated with encoded confidential data categories corresponding to the encoded search data.

The transmitted categories are displayed on the interface IHM together with the references which they are associated with.

According to an exemplary utilization relating to the preceding alternative solution, the user of the computer TB wishes to be put in contact with the user of the terminal TA. The user of the terminal TB activates the search application AR using the interface IHM and inputs in the search field "name" the name of the user of the terminal TA as a search datum. The agent AgC of the computer TB encodes the search datum and transmits it in a request RQ to the server ADS.

Upon reception of the request, the server ADS makes a search in the database BD as described in step R6, and obtains two identical confidential data corresponding to the transmitted search datum. The categories and the references associated with both obtained confidential data are different respectively. The first confidential datum associated with a first reference corresponds to a first name, whereas the second confidential datum associated with a second reference corresponds to a name. The server ADS transmits an answer RP including both references and both categories respectively associated with the computer TB.

During step R8, each category is displayed on the interface IHM together with the reference which it is associated with, for example indicating that a first reference relates to a first name and that the second reference relates to a name.

Upon reading the categories which are transmitted and displayed, the user selects the second reference relating to the category "name" and characterizing more precisely the user of the terminal TA so as to communicate, for example, with the latter using the selected reference.

In order to prevent collisions relating to the separate encoding of two different personal data into the same encoded datum, the unidirectional encoding algorithm AC may include two different encoding functions. Each one of the two functions is applied to each personal datum input and to be coded so as to obtain from the same personal datum two different encoded data concatenated into a couple while being associated with the same category in the database BD. During the search for the reference of the user, the search datum input is also encoded in order to obtain two concatenated different search data to be compared to all the couples of concatenated encoded confidential data recorded in the database.

According to another alternative solution during the recording, each personal datum input using the interface IHM and transmitted to the encoding agent in the terminal TA is derived by the agent into one or more generally several derivation which can be parts of the input personal datum and/or data substantially similar to the input personal datum or to parts thereof, for instance which are different by their spelling and/or pronunciation. Such personal data and the derivations thereof are encoded by the encoding agent and transmitted together with their associated references to the server ADS which records it.

During the search for a reference, each search datum input using the interface IHM and transmitted to the encoding agent is derivated by the agent into one or several more generally several derivations of the input search datum. Such search data and the derivations thereof are encoded by the encoding agent and transmitted to the server ADS which compares it to the encoded confidential data and the encoded derivations thereof recorded in the database BD.

The references of the encoded confidential data and/or the encoded derivation thereof corresponding to the encoded search data and/or the encoded derivation thereof are transmitted to the terminal requesting a search, and are displayed by order of similarity of the derivations of the input search datum with the search datum.

The invention described herein relates to a method for managing confidential data. According to one implementation, the steps of the method of the invention are determined by the instructions of a computer program integrated in a server means ADS communicating with communicating objects TA, TB through a telecommunication network RR-RPQ for managing confidential data of users of communicating objects. The program includes program instructions which, when said program is run in a processor of the server means, thus form the steps of the method according to the invention. The program can also be run partly in the communicating objects TA, TB.

Consequently, the invention also applies to a computer program more particularly a computer program recorded on or in an information support legible by a computer and any data processing device adapted to implement the invention. This program can use any programming language and be in the form of a source code, an object code or an intermediate code between the source code and the object code such as in a partially compiled form or in any other form preferred for implementing the method according to the invention.

The invention claimed is:

1. A method for managing confidential data of users of communicating objects that is recorded in a server, the communicating objects and the server communicating through a telecommunication network, comprising the following steps:

storing, in the server, encoded confidential data and an associated reference for each confidential datum, transmitted from users of communicating objects to the server, wherein each reference associated with a confidential datum is a unique reference selected by and characterizing a particular user;

searching, by a first user from a first communicating object, for a unique reference of a second user among stored encoded confidential data and unique references associated therewith in the server as a function of at least one encoded search datum transmitted from the first user of the first communicating object;

determining if the at least one encoded search datum transmitted by the first user of the first communicating object corresponds to at least one encoded confidential datum of a second user stored in the server; and if the at least one encoded search datum is determined to correspond to an encoded confidential datum of a second user, transmitting, by the server, at least one unique reference of the second user associated with the determined corresponding encoded confidential datum to the first user of the first communicating object.

2. A method according to claim 1, wherein the storing of encoded confidential data includes (i) inputting, by a user from a communicating object, confidential data of the user and the associated unique reference, (ii) encoding said confidential data, and (iii) transmitting the encoded confidential data and the associated unique reference to the server in order to store the confidential data encoded in association with the unique reference in the server among encoded confidential data associated with unique references of other users.

3. A method according to claim 1, further comprising:
updating at least a first confidential datum of a user into a modified confidential datum from a communicating object;
encoding said modified confidential data;
transmitting the first encoded modified confidential datum and the associated unique reference to the server;
deleting an encoded confidential datum associated with the associated unique reference from the server that is identical to the first transmitted encoded confidential datum; and
storing the encoded modified confidential datum in association with the unique reference in the server.

4. A method according to claim 1, wherein the searching for a unique reference includes (i) inputting at least one search datum from the first communicating object, (ii) encoding the at least one search datum into an encoded search datum, (iii) transmitting, from the first communicating object, the encoded search datum to the server for comparing the transmitted encoded search datum to all of the encoded confidential data stored in the server, and (iv) transmitting, from the server to the first communicating object, at least the unique reference of the second user associated with the encoded confidential datum corresponding to the encoded search datum.

5. A method according to claim 1, wherein
during the storing step, the confidential datum is associated with a category which characterizes it and is stored in encoded form in the server in association with said characterizing category and the unique reference, and
during the transmitting step, the unique reference and the characterizing category associated in the server with an encoded confidential datum corresponding to the encoded search datum are transmitted to the first communicating object.

6. A method according to claim 1, wherein the confidential data and the at least one search datum are encoded by applying a unidirectional encoding algorithm to said data.

7. A method according to claim 1, wherein
during the storing step, a confidential datum in a communicating object is derived into at least one confidential derivation which is also (i) encoded, (ii) transmitted to the server and (iii) stored in association with the unique reference of the a user of the the communicating object, and
during the searching step, the search datum in the first communicating object is derived into at least a first derivation which is (i) encoded, (ii) transmitted to the server and (iii) compared to the encoded confidential data and to the associated encoded confidential derivations, stored in the server.

8. A server for managing confidential data of users of communicating objects through a telecommunication network, comprising:
means for storing encoded confidential data and an associated reference for each encoded confidential datum, received from users of communicating objects, wherein said reference associated with a confidential datum is a unique reference selected by and characterizing a particular user;
means for receiving at least one encoded search datum from a first user of a first communicating object;
means for searching for a unique reference of a second user among the stored encoded confidential data and unique references associated therewith as a function of at least one encoded search datum received from the first user of the first communicating object;
means for determining if the at least one encoded search datum received from the first user of the first communicating object corresponds to at least one encoded confidential datum of a second user stored in the server; and
means for transmitting, to the first user of the first communicating object, at least one unique reference of the second user associated with an encoded confidential datum having been determined to correspond to the encoded search datum.

9. A communicating object communicating through a telecommunication network with a server for managing confidential data of users, comprising:
means for inputting said confidential data of a first user of the communicating object;
means for encoding said confidential data;
means for transmitting, to the server, the encoded confidential data and an associated reference of the first user, in order to store the encoded confidential data and associated reference in the server means among encoded confidential data and associated unique references of other users, wherein the reference associated with the confidential data is a unique reference selected by and characterizing the first user;
means for transmitting, to the server, encoded search datum for comparing the transmitted encoded search datum to all the encoded confidential data recorded in the server to determine if the at least one encoded search datum corresponds to at least one encoded confidential datum of a second user stored in the server; and
means for receiving, from the server, at least one unique reference of the second user associated with an encoded confidential datum having been determined to correspond to the encoded search datum.

10. A communicating object, communicating through a telecommunication network with a server for managing confidential data of users, comprising:
means for inputting at least one search datum from a first user at the communicating object;
means for encoding the search datum into an encoded search data;
means for transmitting the encoded search datum to the server for (i) comparing the transmitted encoded search datum to all the encoded confidential data recorded in the server and (ii) determining if the at least one encoded search datum corresponds to at least one encoded confidential datum of a second user stored in the server; and
means for receiving, from the server, at least one unique reference of a second user associated with an encoded confidential datum having been determined, by the server, to correspond to the encoded search data, wherein said unique reference of said second user having been selected by and characterizes said second user.

11. A non-transitory computer readable medium storing a program able to be implemented in a server communicating with communicating objects through a telecommunication network, for managing confidential data of users of communicating objects, said program including instructions which, when the program is run in said server, carry out the following steps:
storing encoded confidential data and an associated reference for each confidential datum received from users of communicating objects, wherein each reference associated with a confidential datum is a unique reference selected by and characterizing a particular user;

receiving at least one encoded search datum from a first user of a first communicating object;

searching for a unique reference of a second user among the stored encoded confidential data and unique references associated therewith as a function of at least one encoded search datum received from the first user of the first communicating object;

determining if the at least one encoded search datum received from the first user of the first communicating object corresponds to at least one encoded confidential datum of a second user; and transmitting, to the first user of the first communicating object, at least one unique reference of a second user associated with an encoded confidential datum having been determined to correspond to the encoded search datum.

* * * * *